United States Patent
Harlamert et al.

(10) Patent No.: US 11,847,160 B2
(45) Date of Patent: *Dec. 19, 2023

(54) USER IDENTIFICATION AND TRACKING SYSTEM

(71) Applicant: POLARIS SOLUTIONS, LLC, New York, NY (US)

(72) Inventors: John Harlamert, Mount Washington, KY (US); Meredith Darbyshire, Rosemont, IL (US); Ken Webber, Rosemont, IL (US); Jerrad Rickard, Rosemont, IL (US); Mark Gleason, Rosemont, IL (US)

(73) Assignee: Polaris Solutions, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/900,562

(22) Filed: Jun. 12, 2020

(65) Prior Publication Data
US 2020/0380028 A1 Dec. 3, 2020

Related U.S. Application Data

(63) Continuation of application No. 14/844,539, filed on Sep. 3, 2015, now Pat. No. 10,698,947.

(51) Int. Cl.
*G06F 16/58* (2019.01)
*H04L 67/50* (2022.01)
*G06Q 30/0201* (2023.01)

(52) U.S. Cl.
CPC ..... *G06F 16/5866* (2019.01); *G06Q 30/0201* (2013.01); *H04L 67/535* (2022.05)

(58) Field of Classification Search
CPC .. G06F 16/5866; G06Q 30/0201; H04L 67/22
See application file for complete search history.

(56) References Cited

U.S. PATENT DOCUMENTS

| 6,073,241 | A | 6/2000 | Rosenberg et al. |
| 6,671,424 | B1 * | 12/2003 | Skoll .......... G06T 1/60 382/305 |
| 6,973,195 | B1 | 12/2005 | Matsui |
| 6,975,733 | B1 | 12/2005 | Choi et al. |
| 7,123,741 | B2 | 10/2006 | Ono |
| 7,979,912 | B1 | 7/2011 | Roka |

(Continued)

FOREIGN PATENT DOCUMENTS

| WO | WO 2005052755 | 6/2005 |
| WO | WO 2018226244 | 12/2018 |

OTHER PUBLICATIONS

Hoffman, Learn How Websites Are Tracking You Online, 2012, Howtogeek.com, pp. 1-5 (Year: 2012).*
Extended European Search Report in European Appln No. 16842570.0 dated Mar. 19, 2019, 7 pages.
Extended European Search Report in European Patent Application No. 17912602.4, dated Dec. 4, 2020, 10 pages.
International Preliminary Report on Patentability in International Appln. No. PCT/US2016/047553, dated Mar. 15, 2018, 7 pages.
International Preliminary Report on Patentability in International Appln. No. PCT/US2017/036851, dated Dec. 19, 2019, 8 pages.

(Continued)

*Primary Examiner* — Taelor Kim
(74) *Attorney, Agent, or Firm* — Fish & Richardson P.C.

(57) ABSTRACT

Disclosed is a system for tracking user activities with a user identification tag stored at the user's Internet-capable device. For example, the system can store a pixel having a color scheme that identifies the user but that is hidden to the user and identifiable by an external computer. The pixel can be stored in the user device's cache for later identification of the user.

19 Claims, 4 Drawing Sheets

(56) References Cited

U.S. PATENT DOCUMENTS

| | | | |
|---|---|---|---|
| 8,946,610 | B2 | 2/2015 | Lwabuchi et al. |
| 8,990,359 | B1 | 3/2015 | Ravi |
| 10,698,947 | B2 | 6/2020 | Harlamert et al. |
| 11,076,005 | B2 | 7/2021 | Harlamert |
| 2005/0114510 | A1 | 5/2005 | Error et al. |
| 2006/0047571 | A1 | 3/2006 | Garcia et al. |
| 2006/0200425 | A1 | 9/2006 | Steele et al. |
| 2007/0112676 | A1 | 3/2007 | Kontio et al. |
| 2007/0124480 | A1 | 5/2007 | Heled et al. |
| 2009/0019148 | A1 | 1/2009 | Britton et al. |
| 2009/0171760 | A1 | 7/2009 | Aarnio |
| 2010/0023550 | A1 | 1/2010 | Erhard et al. |
| 2012/0035994 | A1 | 2/2012 | Fernandez |
| 2013/0166762 | A1 | 6/2013 | Jalan et al. |
| 2013/0246609 | A1 | 9/2013 | Topchy et al. |
| 2014/0041008 | A1 | 2/2014 | Roskind |
| 2014/0143337 | A1* | 5/2014 | McIntosh ............ H04L 67/146 709/204 |
| 2014/0278749 | A1* | 9/2014 | Trenkle ............ G06Q 30/0201 705/7.29 |
| 2015/0135253 | A1 | 5/2015 | Angel |
| 2015/0188897 | A1 | 7/2015 | Grigorovici et al. |
| 2015/0334158 | A1* | 11/2015 | Ravi ............ H04L 67/10 709/217 |
| 2016/0148255 | A1 | 5/2016 | Shariat et al. |
| 2017/0068690 | A1 | 3/2017 | Harlamert et al. |
| 2017/0323158 | A1* | 11/2017 | Gordon ............ G06T 7/74 |
| 2018/0359324 | A1 | 12/2018 | Harlamert |
| 2021/0314412 | A1 | 10/2021 | Harlamert |

OTHER PUBLICATIONS

International Search Report and Written Opinion in International Appln. No. PCT/US2016/047553, dated Nov. 4, 2016, 8 pages.

International Search Report and Written Opinion in International Appln. No. PCT/US2017/036851 dated Aug. 29, 2017, 9 pages.

Paries' Foundation Silverlight 2 Animation, 1st edition, Jan. 2003, Chapter 3, 1 page.

Blog.httpwatch.com [online], "Image Caching in Internet Explorer," Feb. 27, 2008, retrieved on Jun. 2, 2023, retrieved from URL<https://blog.httpwatch.com/2008/02/27/image-caching-in-internet-explorer/>, 8 pages.

HowToGeek.com [online], "The Many Ways Websites Track You Online," Sep. 28, 2016, retrieved on Jan. 4, 2022, retrieved from <https://www.howtogeek.com/115483/htg-explains-learn-how-websites-are-tracking-you-online/>, 6 pages.

Wikipedia.org [online], "Alpha compositing," available on or before Feb. 3, 2012, via Internet Archive: Wayback Machine URL<https://web.archive.org/web/20120203211818/http://en.wikipedia.org/wiki/Alpha_channel>, 5 pages.

Wikipedia.org [online], "Transparency (graphic)," available on or before Feb. 17, 2012, via Internet Archive: Wayback Machine URL<https://web.archive.org/web/20120217053628/http://en.wikipedia.org/>, 6 pages.

Wikipedia.org [online], "Web bug," available on or before Nov. 13, 2012, via Internet Archive: Wayback Machine URL <https://web.archive.org/web/20121113184350/https://en.wikipedia.org/wiki/Web_beacon>, 5 pages.

* cited by examiner

USER IDENTIFICATION AND TRACKING SYSTEM

CROSS-REFERENCE TO RELATED APPLICATIONS

The subject application is a continuation of U.S. application Ser. No. 14/844,539, filed Sep. 3, 2015, of which is incorporated herein by reference in their entirety.

TECHNICAL FIELD OF THE INVENTION

The present application relates generally to a system for identifying and tracking a user. More particularly, the present application relates to a system for identifying and tracking a user using an image identifier stored in cache.

BACKGROUND OF THE INVENTION

Tracking of users on the Internet is an important component of web analytics. Customer tracking can help a business determine whether certain advertisements or marketing campaigns effectively lured the customer to the business' website or application. For example, companies can send email advertisements to users and later track whether those users purchased the products advertised in the emails. The company can then carefully tailor their marketing budget towards those activities that generate the most business.

An email beacon (or a "web bug") is one manner of tracking an online user. The beacon is typically an object embedded in a web page or email that can be checked to determine whether the user has accessed content. For example, a beacon can be included within an email and, when the email is opened, the beacon can make a request back to a server. By sending this request, the server knows the user opened the email; or, in the world of web analytics, the company knows an existing or potential customer opened the email and viewed a marketing campaign in the email when the company receives notification from the server that a request was made. The beacon is typically a single-use identification and is unable to be stored within a browser cache. Similar tracking methods, such as cookies, are blocked or filtered by most email software.

SUMMARY OF THE INVENTION

The present application discloses a method and system for tracking user activities with a user identification tag that is stored on the user's Internet-capable device. For example, the disclosed system can store one or more pixel having a unique color scheme (for example, RGB) and an alpha (A) of 127, so as to be invisible to the user but identifiable by an external computer. Alternately, the alpha value can be different than 127 and the pixel can blend in with surrounding images so as to be camouflage to the user, or have a styling tag that hides the pixel from the user. The user's pixel can be created in advance and, when the user visits a website or registers user information, stored in cache for later identification. Alternately, the pixel can be created in real time when the user opens an email or visits a webpage so as to start the process. The pixel can later be identified by using JavaScript® or similar web-based languages when the user visits a page.

In particular, the present application discloses a method including creating a user identification tag having an associated user identification number adapted to identify a user to an electronic location, and further having a generic identifier identifying the user identification tag as among a plurality of user identification tags, receiving a user visit to the electronic location from a user device of a user, storing the user identification tag in image cache of the user device, searching for users having the user identification tags, identifying the generic identifier of the user identification tag and determining the user identification tag is among the plurality of user identification tags, and identifying the user associated with the user identification tag.

Further disclosed is a method including creating a user identification tag having an associated user identification number adapted to identify a user to an electronic location, and further having a generic identifier identifying the user identification tag as among a plurality of user identification tags, receiving a user visit to the electronic location from a user device of a user, storing the user identification tag in the user device, searching for users having the user identification tags, identifying the generic identifier of the user identification tag and determining the user identification tag is among the plurality of user identification tags, and identifying the user associated with the user identification tag, wherein the user identification tag is an image having color components respectively associated with color numbers, and wherein the color numbers of each of the plurality of user identification tags is unique.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present application discloses a system for tracking user activities with a user identification tag stored at the user end of the network. For example, the system can store a pixel having a color scheme that identifies the user but that is hidden to the user and identifiable by an external computer. The user's identification tag can be stored in the user device's image cache for later identification of the user.

Figure 1:
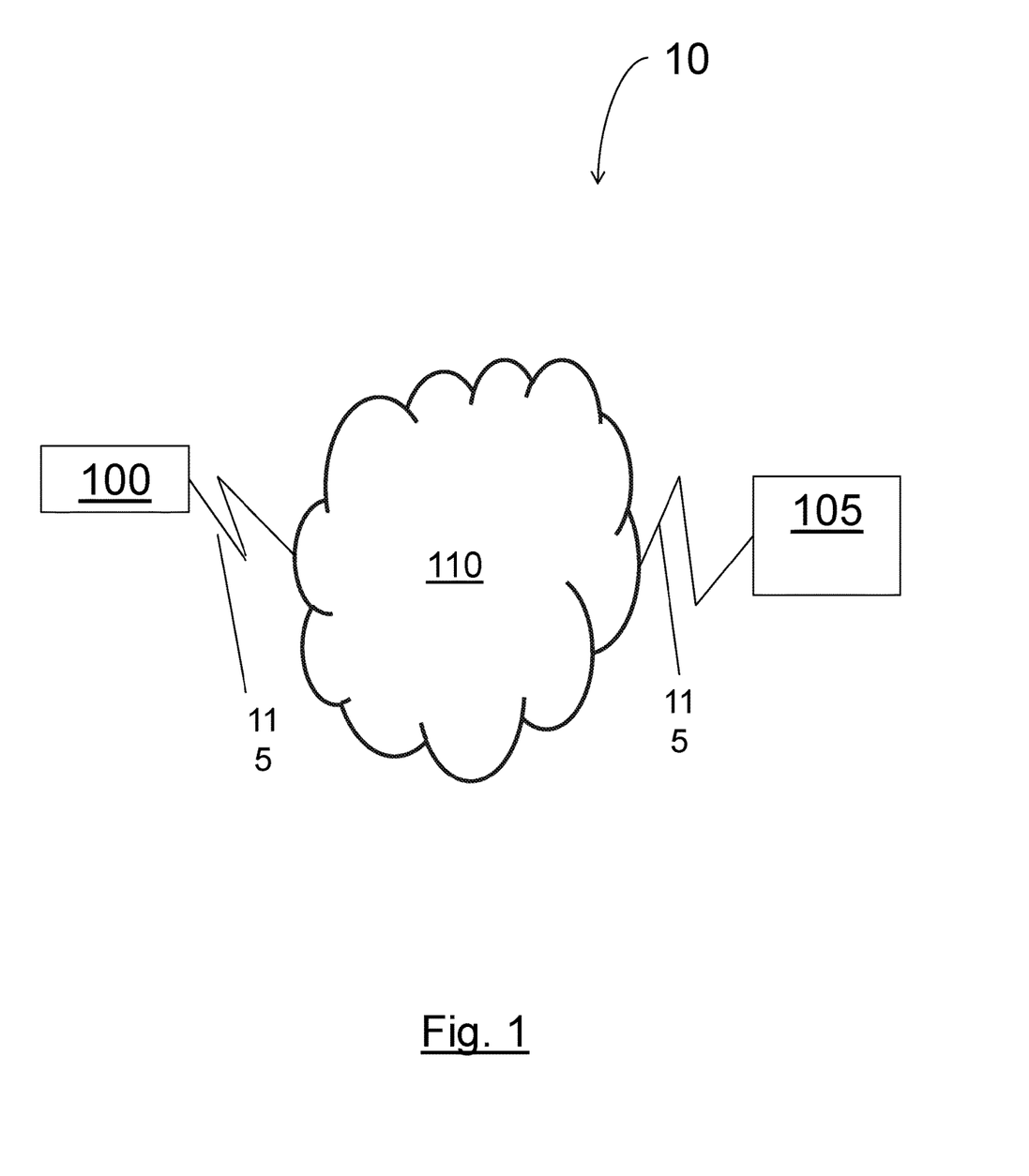
FIG. 1 is a schematic view of a system according to embodiments of the present application.

Referring to FIG. 1, the present application discloses a system 10 including a user device 100 that may be operably coupled to a server 105 via a network 110 by way of communication links 115, such as, for example, the Internet. The user device 100 communicates with the server 105 to transmit data to and receive data from server 105. Such data can include, for example, advertising campaigns, emails or text messages, webpage visits, preferences or interests of the user, shopping history, purchase history, email or text message history, or any other data. The data can be communicated from the user device 100 to the server 105, and vice versa.

The user device 100 can be a device of any type that allows the transmission and/or reception of data. By way of example, the user device 100 can include a smart phone (e.g. iPhone®), personal computer, voice and video telephone set, streaming audio and video media player, integrated intelligent digital television receiver, work station, radio, personal digital assistant (PDA), mobile satellite receiver, GPS receiver, software system, or any combination of the above.

The server 105 can also be a device of any type that allows for the transmission and/or reception of data, and that is capable of storing information to be transmitted to the user device 100. For example, the server 105 can include any device listed above with respect to the user device 100, or can include a non-transitory computer-readable recording medium, such as a hard drive, DVD, CD, flash drive, volatile or non-volatile memory, RAM, or any other type of data storage. As used throughout this application, the term "non-transitory computer-readable recording medium" excludes only signals and carrier waves, per se, and is not meant to exclude other types of memory that may be considered "transitory" such as RAM or other forms of volatile memory.

The network 110 may be a single network or a plurality of networks of the same or different type. For example, the network 110 may include a local telephone network in connection with a long distance network. Further, the network 110 may be a data network, an Intranet, the Internet or a telecommunications network in connection with a data network. Any combination of telecommunications and data networks may be used without departing from the spirit and scope of the present application. For purposes of discussion, it will be assumed that the network 110 is the Internet.

Figure 2:
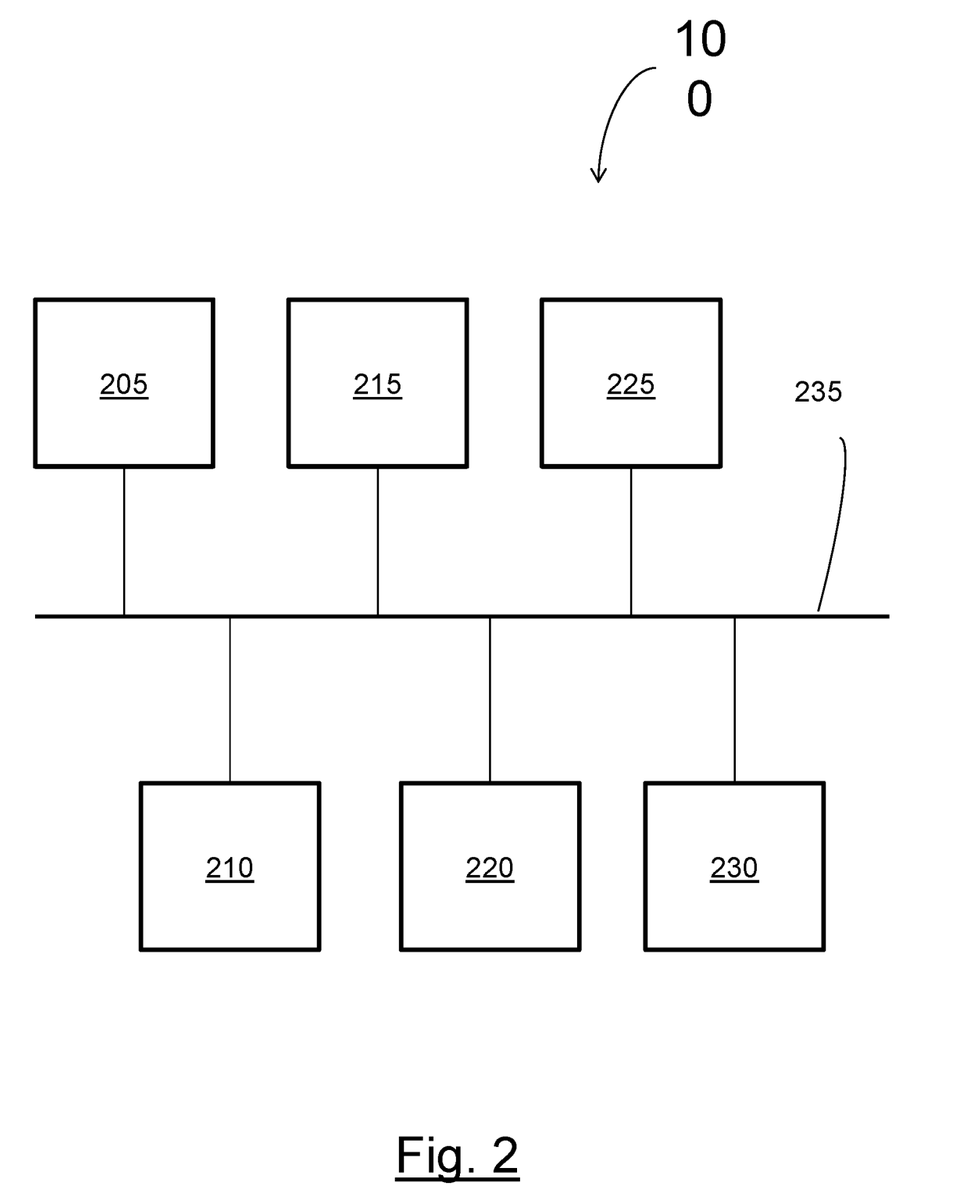
FIG. 2 is a schematic view of a user device according to embodiments of the present application.

FIG. 2 is a schematic diagram illustrating exemplar hardware components of a user device 100 using an embodiment of the present application. As shown, the user device 100 can include an interface 205, processor 210, transceiver 215, display 220, GPS sensor 225 and a memory 230 connected via a bus 235.

The interface 205 allows the user to input information or commands into the user device 100 and to transmit the information or command to the server 105 via the network 110. For example, the user can input personal information into the interface 205 when registering a user profile on a webpage. Such personal information can provide an identification of the user and associate the user with a specific user identification tag having a specific user identification number, for example. By way of example, the interface can include a keyboard, mouse, touch screen, audio recorder, audio transmitter, member pad, voice-to-text or any other device that allows for the entry of information from a user.

The processor 210 facilitates communication between the various components of the user device 100. The processor 210 can be any type of processor or processors that alone or in combination can facilitate communication within the user device 100 and, together with the transceiver 215, transmit information from the user device 100 to external devices. For example, the processor 210 can be a desktop or mobile processor, a microprocessor, a single-core or a multi-core processor.

The transceiver 215 can be any device that can transmit data from the user device 100 or can receive data within the user device 100 from an external data source. By way of example, the transceiver 215 can be any type of radio transmission antenna, cellular antenna, hardwired transceiver, or any other type of wired or wireless transceiver that is capable of communicating with an external device.

The display 220 can display various information for the user to view and interpret, including commercial offers, a search engine interface, search engine results, or requests for the user to input information via the interface 205. By way of example, the display 220 can include a liquid crystal display (LCD), organic light emitting diode (OLED) display, plasma screen, cathode ray tube display, or any other kind of black and white or color display that will allow the user to view and interpret information on the user device 100.

In an embodiment, a GPS sensor 225 is provided and adapted to allow the user device 100 to determine GPS coordinates and thus determine the user's geographic orientation. The GPS coordinates of the user device 100 can be used to provide targeted advertising to the user, for example, determining nearby commercial vendors that the user is interested in based on the user information associated with the user identification tag.

Similar to the server 105 discussed above, the memory 230 can include any non-transitory computer-readable recording medium, such as a hard drive, DVD, CD, flash drive, volatile or non-volatile memory, RAM, or any other type of data storage.

Figure 3:
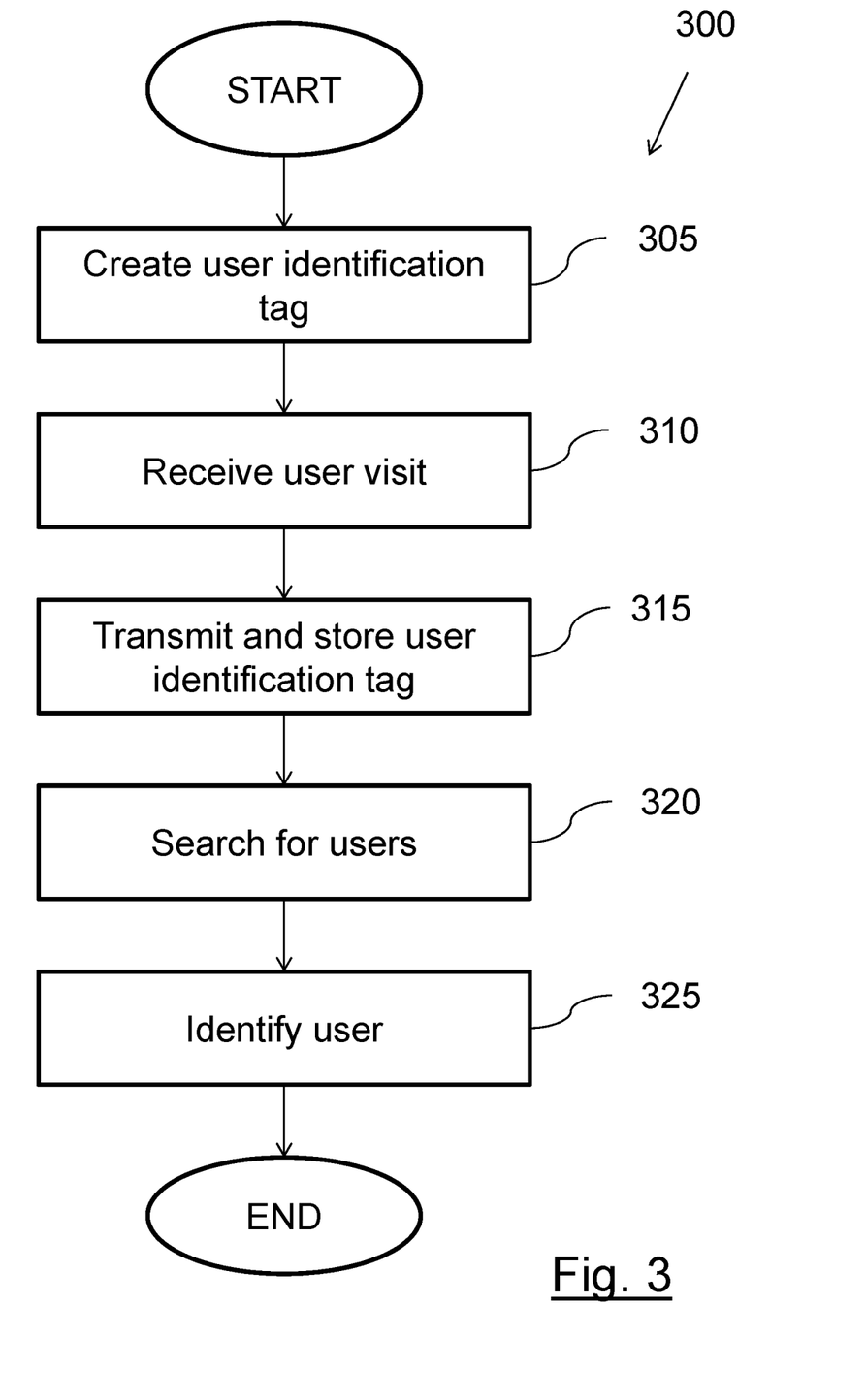
FIG. 3 is a flowchart illustrating a process according to embodiments of the present application.

FIG. 3 illustrates a process for tracking user behavior according to embodiments of the present application. As shown, the process 300 begins and creates a user identification tag 305. For example, the user identification tag can be associated with a unique user and include a user identification number associated with that user.

As discussed below in more detail, the user identification tag can include a pixel or other form of data including color image data, such as an RGBA, CMYKA (cyan, magenta, yellow, black, alpha), or other color pixel or combination of pixels. In an embodiment, the user identification tag is an RGBA pixel that includes a user identification number, for example, a seven digit integer. The user identification tag can also include a plurality of pixels, such as a plurality of pixels that are linked together so as to provide a larger number of user identification numbers. For example, a single pixel can represent approximately 18 million user identification numbers. By linking pixels together, the number of user identification numbers increases from 18 million for one pixel to 324 trillion (18 million×18 million) with two pixels, and so on.

The user identification number can be based on the RGB or other color coordinates because RGB coordinates include a numerical identifier for the color of the pixel, with one numerical identifier for each of the R, G, and B components of the pixel(s). In particular, the R, G, and B components can be any number between 0-255. For example, a user identification tag can include an R=74, G=55, and B=155, and the server 105, user device 100, or other electronic device can create a user identification number associated with the R=74, G=55, and G=155 combination. The server 105 can also associate an alpha value of A=127 for the pixel such that the pixel will be invisible to the user but identifiable by an electronic device, such as the server 105. Alternately, the alpha value can be any other number such that the pixel is visible, but the RGB coordinates can be similar to the surrounding images or otherwise blend in with the surrounding images so as to be camouflage to the user. In some embodiments, the pixel is not visible to the user because the pixel is subject to an HTML styling tag that hides the pixel in a manner similar to conventional beacons. Any other manner of creating the user identification tag can be implemented without departing from the spirit and scope of the present application.

In an embodiment, the RGB or other color coordinate values can act as parts of the user identification number. For example, the image stored in the user's image cache can include RGB coordinates having a value from zero to 2,559,999. In this manner, the entire value associated with the first R value can act as the first three numbers of the user identification number, and the second two values associated with the G an B values can be the next digits of the user identification number. For example, in the case of an identification number of 2,559,999, the RGB values would be R=255, G=99 or 199, and B=99 or 199. The system can also include two or more pixels. In the scenario with two pixels, the pixel can be associated with an identification number of up to 2,559,999,999,999 with pixel 1 having values of R=255, G=99 or 199, and B=99 or 199; and pixel 2 having values of R=99 or 199, G=99 or 199, and B=99 or 199.

After the process 300 creates the user identification tag 305, the process 300 proceeds to step 310, where the user visits an electronic location 310. For example, the user can visit a webpage, web or mobile application, email site (either browser or application-based), or any other electronic location. In an embodiment, the user can visit a web page and input personal information into the web page, such as the user's name, address, email address, telephone number, and/or credit card number, for example, when registering a user name and password or otherwise registering an account. In other embodiments, the user information can be automatically transferred to the server 105 upon the user visiting the electronic location. Upon receiving this user information, the system 10 can associate the visitor with a unique identifying number associated with a user identification tag, such as an RGBA pixel. In an embodiment, the unique identifying number is an integer that represents the user.

Following step 310, the process 300 can transmit and store the user identification tag in the user memory 315, for example, in image cache. For example, the pixel can be transmitted by email to a browser-based email platform (e.g., Gmail® or Yahoo®) and, when opened by the user's browser, the pixel can be stored in image cache. Alternately, the pixel can be transmitted to an email program (e.g., Microsoft Outlook®) and when opened, the email can automatically link to a web browser so that the browser can see the pixel image and store it in web cache. In some embodiments, the user is never aware of the storage of the pixel because the browser is running "behind the scenes," e.g., running on the computer without being displayed to the user.

Storing the user identification tag in image cache is advantageous because image cache is deleted less often than cookies or other forms of cache, and accordingly, the user can be tracked more easily by storing the user identification tag in cache. In some embodiments, the user identification tag is pre-generated prior to the user visiting the electronic location, and assigned to the user once the user enters identifying information during the user visit. For example, the system 10 can pre-generate a pixel having a seven digit user identification number based on the RGB components of the pixel. That pixel can then be assigned to the visitor and stored in the memory 230 of the user device 100, for example, in the image cache of the user device 100, once the user device enters the user information either automatically or through the interface 205.

In some embodiments, the pixel is not an image per se, but is a tag that is a reference to an image. In this scenario, step 305 can be omitted and the pixel can instead be created in real time. For example, the user can open an email and the email can contain an image tag that is a reference to the image. When a browser renders a web page or when an email client renders an HTML email it can load the entire document source first. The browser can then find all references to images or other items that are to be requested from the server 105. Among those images can be the pixel, which is requested and loaded into the email or web page.

In an embodiment of the present application, the user can open an email or other electronic location and the browser can read the image tag associated with the pixel. Afterwards, the user device 100 requests an image (the pixel) that does not actually exist at the time. For example, the email can include a link to what appears to be a path of an image, but where the image is missing from the server 105. Instead, a request can be received at the server 105 and a PHP script can be executed.

The PHP script can dynamically build the image in real-time once executed completely, rather than in advance as discussed above with respect to step 305. The PHP script can alter the HTML headers so that a response to a request can come in the form of an image, i.e., the pixel. Because the pixel is created in real-time, the pixel can have the same name for different pixels and different users. By using the same name for all pixels, the process 300 can more easily identify the pixel when later searching the user's image cache, as discussed below in more detail.

Following step 315, the process 300 can search for users 320. For example, the process 300 can receive a request from a user to provide information from a web page, and the server 105 of the web page can then search the memory 230 of the visitor to identify the visitor. In some embodiments, the process 300 can determine whether the user has a user identification tag stored in image cache at the user device 100 by reading the image cache of the user device (e.g., within the memory 230 of the user device 100) and searching for a generic identifier of all user identification tags. For example, the generic identifier can be the common name given to pixels created in real-time, as discussed above. Alternately, or in addition to the above, the generic identifier can be any RGBA pixel with an A value of 127 (i.e., a transparent pixel or pixel otherwise invisible to the user), or some other component that is the same for all pixels used. In so doing, the process 300 can search for user identification tags of different users by implementing the same process—for example, searching for the generic tag identifier. This searching can be performed with JavaScript® web language or any other similar method. Any other manner of searching for visitors can be implemented without departing from the spirit and scope of the present application.

Following step 320, the process 300 can identify the user, for example, by determining the user identification number associated with the user. In some embodiments, the process 300 can determine the user by associating the RGB components of the user identification tag with the user identification number previously assigned to the user identification tag having those RGB components. For example, the pixel can be converted to an HTML canvas element and a script can extract the RGBA or other identifying data from the pixel to determine the user identification number. In some embodiments, the script can extract the data in a predetermined sequence to obtain the exact identification number. The identification number and any other data (for example, which website was visited) can then be transmitted via AJAX request or via any other method for data entry.

At this stage, the system 300 has determined that a user who previously inputted or had their user information inputted to the server 105 has visited an electronic location such as a web page or sent email. In so doing, the user's preferences, interests, shopping behavior, purchase behavior, web traffic behavior, and other characteristics can be tracked. Further, the user identification tag can be stored in image cache, which is deleted less often than cookies or other forms of cache, and accordingly, the user can be tracked for a longer period of time relative to these storage methods.

Figure 4:
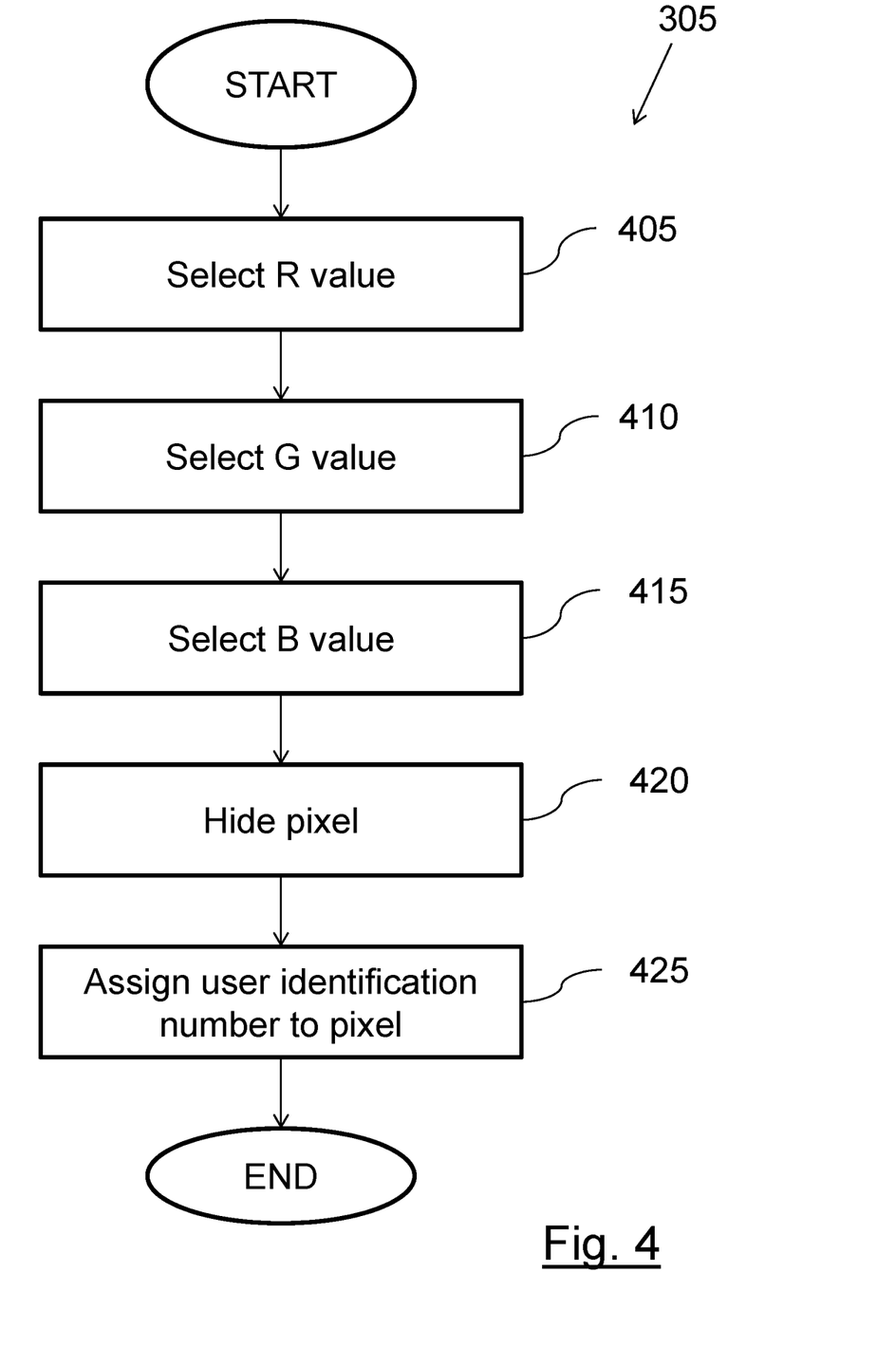
FIG. 4 is a flowchart illustrating a process for creating a user identification tag according to embodiments of the present application.

FIG. 4 illustrates a method of creating a user identification tag 305 according to some embodiments of the present application. As shown, the method 305 starts and proceeds to step 405, where it selects an R value associated with the red color of the pixel. For example, the method 305 can select any R value between 0-255. The method 305 can then proceed to step 410, where a G value is selected, also between 0-255. Similarly, the method 305 can select a B value between 0-255 in step 415. The method can optionally associate an alpha or A value of 127 with the pixel in step 420, so as to make the pixel invisible to the user of the user device 100 but visible to a computer reading the memory 230 of the user device 100. Alternately, the alpha or A value can be any other value, and the pixel can blend in with its surroundings. Still alternately, the alpha or A value can be any value, and HTML styling tags can be used to hide the pixel in the same manner as a conventional beacon.

Followings step 420, the process 305 assigns a unique user identification number to the pixel in step 425. The user identification number can be a seven digit number associated with the RGB values of the pixel, for example. Accordingly, when the user subsequently visits an electronic location such as a web page, the user identification tag can be retrieved, the RGB components can be determined, and the user can be identified based on the association of the user identification number to the RGB components. Following step 425, the process 305 ends.

As discussed herein, the color scheme associated with the pixel can be the RGB system. However, any color system can be employed without departing from the spirit and scope of the present application, for example, RGB, CMYK, or any others. Further, the user identification tag need not be a single pixel, but can be a combination of pixels or any other form of data.

As discussed herein, the server 105 can be a single server. However, any combination of servers can be implemented, for example, a single server, multiple servers, a server farm, or server(s) in communication with edge servers, for example.

The steps of the present application are presented in the disclosed order for explanatory purposes only. The order of the steps is not to be considered mandatary, and indeed, the steps can be performed in any order.

As used herein, the term "coupled" and its functional equivalents are not intended to necessarily be limited to a direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A method comprising:
   creating an identification tag configured to identify a visit to an electronic location from a user device of a user, wherein the identification tag is created in response to receiving an image request from the user device, wherein the identification tag is imperceptible to the user but identifiable by an electronic device, and wherein the identification tag comprises:
      an image having color components, and
      a unique identification number associated with the user, the unique identification number being derived from color values associated with the color components of the image;
   associating a generic identifier with the identification tag, wherein the generic identifier:
      (1) comprises a common name associated with a plurality of previously created identification tags,
      (2) distinguishes the identification tag and the plurality of previously created identification tags from other images stored in an image cache of the user device, and
      (3) is searchable within the image cache of the user device to identify the identification tag associated with the common name and the plurality of previously created identification tags associated with the common name, and
   wherein associating the generic identifier with the identification tag comprises associating the common name with the identification tag as the identification tag is created in real-time responsive to receiving the image request from the user device, and wherein the identification tag that is created in real-time responsive to the image request does not exist at a server that receives the image request at the time the image request is received;
   receiving an indication of the visit to the electronic location from the user device; and
   providing the identification tag and the generic identifier to the user device for storage.

2. The method of claim 1, wherein the identification tag is created prior to receiving the indication of the visit to the electronic location from the user device.

3. The method of claim 1, wherein the electronic location is one of a web page, email, text message, and application download.

4. The method of claim 1, wherein providing the identification tag and the generic identifier to the user device for storage comprises sending the identification tag and the generic identifier to the user device for storage in the image cache of the user device.

5. The method of claim 1, wherein the image includes an alpha (A) value that makes the image invisible or transparent to the user.

6. A method comprising:
reviewing data in a memory of a user device of a user, wherein the memory is an image cache of the user device;
identifying a plurality of identification tags, wherein identifying the plurality of identification tags comprises searching within the image cache of the user device for a generic identifier that:
 (1) comprises a common name that is associated with the plurality of identification tags, and
 (2) distinguishes the plurality of identification tags from other images stored in an image cache of the user device,
wherein each of the plurality of identification tags is created in real-time responsive to receiving a corresponding image request from the user device, and wherein each of the plurality of identification tags that is created in real-time responsive to the corresponding image request comprises an image that does not exist at a server that receives the corresponding image request at the time the corresponding image request is received;
identifying, from among the plurality of identification tags, an individual identification tag configured to identify a visit to an electronic location from the user device, wherein the individual identification tag is imperceptible to the user but identifiable by an electronic device, and wherein the individual identification tag comprises:
 (1) a pixel having color components, and
 (2) a unique identification number associated with the user, the unique identification number being derived from color values associated with the color components of the pixel;
and
identifying the user based on the associated unique identification number.

7. The method of claim 6, wherein the step of identifying the user includes determining user information provided by the user device and associating the user information with the unique identification number.

8. An apparatus comprising:
one or more processors;
a non-transitory computer readable storage medium configured to provide processor-executable instructions to the one or more processors, wherein the processor executable instructions are adapted to cause the one or more processors to:
 review data in a memory of a user device of a user, wherein the memory is an image cache of the user device;
 identify a plurality of identification tags, wherein identifying the plurality of identification tags comprises searching within the image cache of the user device for a generic identifier that:
  (1) comprises a common name that is associated with the plurality of identification tags, and
  (2) distinguishes the plurality of identification tags from other images stored in an image cache of the user device,
 wherein each of the plurality of identification tags is created in real-time responsive to receiving a corresponding image request from the user device, and wherein each of the plurality of identification tags that is created in real-time responsive to the corresponding image request each comprises an image that does not exist at a server that receives the corresponding image request at the time the corresponding image request is received;
 identify, from among the plurality of identification tags, an individual identification tag configured to identify a visit to an electronic location from the user device, wherein the individual identification tag is imperceptible to the user but identifiable by an electronic device, and wherein the individual identification tag comprises:
  (1) an image having color components, and
  (2) a unique identification number associated with the user, the unique identification number being derived from color values associated with the color components of the image; and
 identify the user based on the associated unique identification number.

9. The apparatus of claim 8, wherein the image includes an alpha (A) that makes the image invisible or transparent to the user.

10. The apparatus of claim 8, wherein the processor executable instructions are further adapted to cause the processor to determine user information provided by the user device and associate the user information with the unique identification number.

11. The method of claim 1, further comprising:
identifying the identification tag in a memory of the user device;
determining the unique identification number; and
upon determining the unique identification number, associating the user with the identification tag.

12. The method of claim 1, wherein creating the identification tag occurs during the visit to the electronic location from the user device.

13. The method of claim 1, wherein creating the identification tag occurs prior to the visit to the electronic location from the user device.

14. The method of claim 1, further comprising: identifying the generic identifier in a memory of the user device.

15. The method of claim 1, wherein the color values are red/green/blue (RGB) values.

16. The method of claim 1, wherein the color values are cyan/magenta/yellow/black (CMYK) values.

17. The method of claim 1, wherein the generic identifier comprises a common alpha (A) value assigned to the plurality of previously created identification tags.

18. The method of claim 1, wherein the generic identifier comprises a common HTML element associated with the plurality of previously created identification tags.

19. The method of claim 1, wherein the identification tag and the plurality of previously created identification tags comprise all identification tags stored on the image cache of the user device that are associated with the common name.

* * * * *